US010587837B2

(12) United States Patent
Wan

(10) Patent No.: US 10,587,837 B2
(45) Date of Patent: Mar. 10, 2020

(54) IMAGE OBTAINING METHOD, CONTROLLED DEVICE, AND SERVER

(71) Applicant: TENCENT TECHNOLOGY (SHENZHEN) COMPANY LIMITED, Shenzhen (CN)

(72) Inventor: Changxun Wan, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 15/928,998

(22) Filed: Mar. 22, 2018

(65) Prior Publication Data
US 2018/0213178 A1 Jul. 26, 2018

Related U.S. Application Data

(63) Continuation of application No. PCT/CN2017/074812, filed on Feb. 24, 2017.

(30) Foreign Application Priority Data

Mar. 2, 2016 (CN) .......................... 2016 1 0117911

(51) Int. Cl.
H04N 5/76 (2006.01)
H04N 1/00 (2006.01)
(Continued)

(52) U.S. Cl.
CPC ............... *H04N 5/76* (2013.01); *G06F 16/29* (2019.01); *G06F 16/50* (2019.01); *G06F 16/51* (2019.01);
(Continued)

(58) Field of Classification Search
CPC ........ H04N 5/76; H04N 5/77; H04N 1/00307; H04N 21/8153; H04N 5/772; H04N 21/2743; G06Q 50/01; G06Q 30/0269
See application file for complete search history.

(56) References Cited

U.S. PATENT DOCUMENTS

2002/0049728 A1* 4/2002 Kaku ..................... G06Q 30/02
2006/0111935 A1   5/2006 Bao et al.
(Continued)

FOREIGN PATENT DOCUMENTS

CN      103020254      4/2013
CN      103179156      6/2013
(Continued)

OTHER PUBLICATIONS

International Search Report dated Apr. 28, 2017 in PCT/CN2017/074812 filed Feb. 24, 2017. (With English Translation).
(Continued)

Primary Examiner — Ahmed A Berhan
(74) Attorney, Agent, or Firm — Oblon, McClelland, Maier & Neustadt, L.L.P.

(57) ABSTRACT

Aspects of the disclosure provide a method for processing images. The method includes acquiring, by image generation circuitry of a device (e.g., imaging device), an image according to a preset time interval for acquiring images, storing the acquired image in first buffering circuitry of the device, receiving a recording instruction and copying the acquired image from the first buffering circuitry to second buffering circuitry of the device according to the recording instruction.

17 Claims, 7 Drawing Sheets

(51) Int. Cl.

| | | |
|---|---|---|
| H04N 21/658 | (2011.01) | |
| H04N 21/239 | (2011.01) | |
| H04N 21/81 | (2011.01) | |
| H04N 21/2743 | (2011.01) | |
| G06F 16/51 | (2019.01) | |
| H04N 5/77 | (2006.01) | |
| G06F 16/50 | (2019.01) | |
| G06F 16/29 | (2019.01) | |
| G06Q 50/00 | (2012.01) | |
| H04W 4/02 | (2018.01) | |
| H04L 29/12 | (2006.01) | |
| H04L 12/58 | (2006.01) | |
| H04N 1/21 | (2006.01) | |
| H04N 21/472 | (2011.01) | |

(52) U.S. Cl.
CPC ..... *H04N 1/00204* (2013.01); *H04N 1/00209* (2013.01); *H04N 1/00307* (2013.01); *H04N 1/21* (2013.01); *H04N 5/77* (2013.01); *H04N 5/772* (2013.01); *H04N 21/2393* (2013.01); *H04N 21/2743* (2013.01); *H04N 21/47202* (2013.01); *H04N 21/6581* (2013.01); *H04N 21/8153* (2013.01); *G06Q 50/01* (2013.01)

(56) References Cited

U.S. PATENT DOCUMENTS

| | | |
|---|---|---|
| 2009/0051768 A1 | 2/2009 | DeKeyser |
| 2013/0128067 A1 | 5/2013 | Boland et al. |
| 2014/0140675 A1 | 5/2014 | de Sa et al. |
| 2015/0009365 A1* | 1/2015 | Sasaki .................. H04N 1/2112 348/231.9 |
| 2016/0028960 A1 | 1/2016 | Ko et al. |

FOREIGN PATENT DOCUMENTS

| | | |
|---|---|---|
| CN | 103312757 | 9/2013 |
| CN | 104298754 | 1/2015 |
| CN | 104580908 | 4/2015 |
| CN | 204408538 | 6/2015 |
| CN | 104871203 | 8/2015 |
| CN | 105635318 | 6/2016 |
| JP | 2015-092399 | 5/2015 |
| KR | 10-2015-0044143 | 4/2015 |
| KR | 10-1542698 | 8/2015 |
| KR | 10-1577093 | 12/2015 |
| WO | WO 94/13191 | 6/1994 |

OTHER PUBLICATIONS

Japanese Office Action dated Nov. 11, 2019 in Japanese Patent Application No. 2018-545618, with English translation, citing documents AA-AD and AO.

Chinese Office Action dated Nov. 26, 2019 in Chinese Patent Application No. 201610117911.1, with concise English translation, citing documents AO-AS therein.

Korean Office Action dated Oct. 16, 2019 in Korean Patent Application No. 10-2018-7027233, with concise English translation, citing documents AT-AV therein.

* cited by examiner

IMAGE OBTAINING METHOD, CONTROLLED DEVICE, AND SERVER

RELATED APPLICATION

This application is a continuation of International Application No. PCT/CN2017/074812, filed on Feb. 24, 2017, which claims priority to Chinese Patent Application No. 201610117911.1, entitled "IMAGE OBTAINING METHOD AND SYSTEM" filed with the Patent Office of China on Mar. 2, 2016. The entire disclosures of the prior applications are hereby incorporated by reference in their entirety.

FIELD OF THE TECHNOLOGY

The present disclosure relates to the field of image acquisition, and in particular, to an image obtaining method, a controlled device, and a server.

BACKGROUND OF THE DISCLOSURE

With the development of vehicles, people travel quite conveniently. More and more people travel around the world and need to record many wonderful moments happened around them. A conventional recording method is to use devices such as a recorder or a sports camera to record. However, the conventional recording method needs very professional devices, consequently causing high costs.

SUMMARY

An image obtaining method, a controlled device, and a server are provided according to various embodiments of this application.

Aspects of the disclosure provide a method for processing images. The method includes acquiring, by an image generation circuitry of a device (e.g., imaging device), an image according to a preset time interval for acquiring images, storing the acquired image in first buffering circuitry of the device, receiving a recording instruction and copying the acquired image from the first buffering circuitry to second buffering circuitry of the device according to the recording instruction.

Further, the method includes uploading the acquired image that is stored in the second buffering circuitry of the device to a server device via a network. In an embodiment, after the copying the acquired image from the first buffering circuitry to the second buffering circuitry of the device according to the recording instruction, the method further includes clearing the first buffering circuitry of the device to remove the acquired image that has been copied to the second buffering circuitry. Further, in an example, after the uploading the acquired image that is stored in the second buffering circuitry of the device to the server device via the network, the method includes clearing the second buffering circuitry of the device to remove the acquired image from the second buffering circuitry.

In some embodiments, before the acquiring the image according to the preset time interval for acquiring the images, the method further includes associating the device with a first user identity, receiving a configuration instruction that is provided via the first user identity and configuring a space ratio between the first buffering circuitry and the second buffering circuitry of the device according to the configuration instruction.

Further, in some embodiments, after the acquiring the image according to the preset time interval for acquiring the images, the method includes obtaining a time and/or a geographical location of the acquired image, and uploading the acquired image in the second buffering circuitry and the time and/or the geographical location of the acquired image to a server device via a network.

In an example, to copy the acquired image from the first buffering circuitry to the second buffering circuitry of the device according to the recording instruction, the method includes copying multiple acquired images from the first buffering circuitry to the second buffering circuitry of the device according to the recording instruction.

To associate the device with the first user identity, in an example, the method includes associating the device with at least one of an instant messaging account, a social application account, and a phone number.

Aspects of the disclosure provide an apparatus that includes imaging circuitry, memory circuitry, interface circuitry and processing circuitry. The imaging circuitry is configured to acquire images according to a preset time interval. The memory circuitry is configured to form a first buffer and a second buffer. The interface circuitry is configured to connect the apparatus to a network. The processing circuitry is configured to store an acquired image in the first buffer, receive a recording instruction via the interface circuitry, and copy the acquired image from the first buffer to the second buffer according to the recording instruction.

Aspects of the disclosure provide a method for processing images. The method includes receiving, at a server device, an image that is uploaded from an imaging device. The imaging device includes a first buffer and a second buffer. The imaging device stores an acquired image in the first buffer, copies the acquired image from the first buffer to the second buffer in response to a recording instruction, and uploads the acquired image from the second buffer to the server device. The method further includes notifying a first user identity that is associated with the imaging device, receiving a sharing instruction from the first user identity, and sharing the uploaded image to a social platform according to the sharing instruction.

In some embodiments, the method includes associating uploaded images from the imaging device with geographic locations where the uploaded images are taken, obtaining a geographic location of a second user identity, determining a corresponding image to the obtained geographic location of the second user identity according to the association of the uploaded images with the geographic locations, generating a reminder according to the corresponding image, and sending the reminder to the second user identity.

Further, in an example, the method includes receiving a time segment that is selected by the second user identity, selecting a corresponding image according to the time segment, and sending the selected image to the second user identity.

Aspects of the disclosure provide a server device that includes interface circuitry and processing circuitry. The interface circuitry is configured to receive an image that is uploaded from an imaging device. The imaging device includes a first buffer and a second buffer. The imaging device stores an acquired image in the first buffer, copies the acquired image from the first buffer to the second buffer in response to a recording instruction, and uploading the acquired image from the second buffer. The processing circuitry is configured to notify a first user identity that is associated with the imaging device, receive a sharing instruction from the first user identity and share the uploaded image to a social platform according to the sharing instruction.

Details of one or more embodiments of the present disclosure are provided in the following accompanying drawings and descriptions. Additional features, objectives, and advantages of the present disclosure will be derived from the specification, accompanying drawings, and claims.

BRIEF DESCRIPTION OF THE DRAWINGS

To describe the technical solutions in the embodiments of the present disclosure or in the related technologies more clearly, the following briefly describes the accompanying drawings required for describing the embodiments or the related technologies. The accompanying drawings in the following description show merely some embodiments of the present disclosure, and a person of ordinary skill in the art may still derive other drawings from these accompanying drawings.

DESCRIPTION OF EMBODIMENTS

To make objectives, technical solutions and advantages of the present disclosure more understandable and comprehensible, the present disclosure is further described in detail below with reference to accompanying drawings and embodiments. It should be understood that, specific embodiments described herein are merely used for explaining the present disclosure, but not used to limit the present disclosure.

It should be understood that terms such as "first" and "second" used in the present disclosure may be used to describe various elements in this application, but these elements are not limited by these terms. These terms are merely used to differentiate a first element with another element. For example, a first client may be referred to as a second client without departing the scope of the present disclosure. Similarly, the second client may be referred to as the first client. The first client and the second client are both clients, but not the same client.

Figure 1:
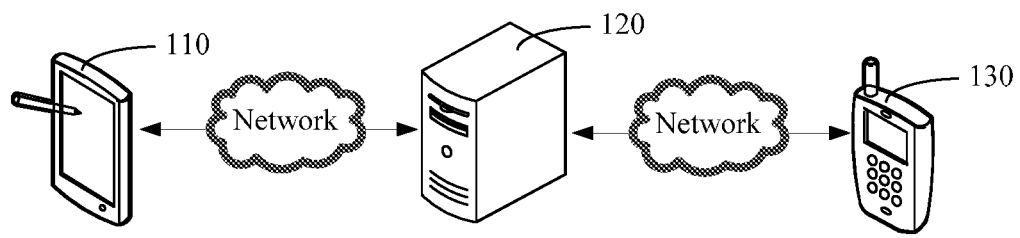
FIG. 1 is a schematic diagram of an application environment of an image obtaining method according to an embodiment.

FIG. 1 is a schematic diagram of an application environment of an image obtaining method according to an embodiment. As shown in FIG. 1, the application environment includes a controlled device (e.g., imaging device) 110, a server (e.g., server device) 120, and a terminal (e.g., terminal device) 130. The controlled device 110 and the terminal 130 communicate with the server 120 by using a network.

The controlled device 110 may be a device with an image shooting function and a storage space of the controlled device 110 is divided into a first buffer and a second buffer. The first buffer is used for storing an acquired image and the second buffer is used for storing an image to be uploaded to the server 120.

The terminal 130 may be devices such as a smartphone, a tablet, and a personal computer. The terminal 130 is installed with an instant messaging client (e.g., software application), so that a user can log in the instant messaging client to control the bound controlled device 110.

Figure 2A:
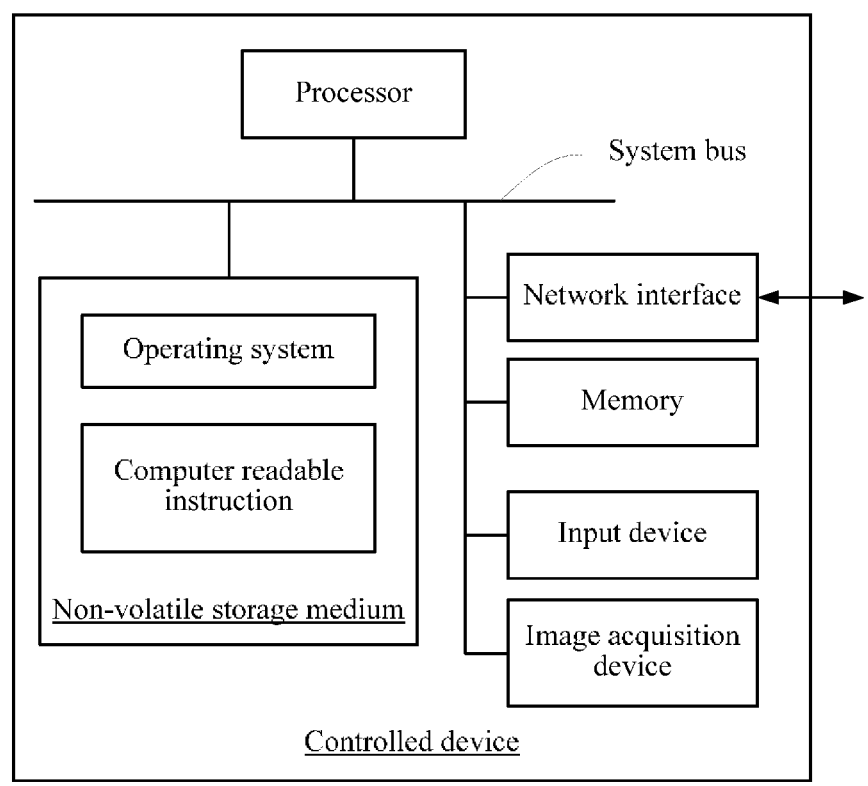
FIG. 2A is a schematic diagram of an internal structure of a controlled device according to an embodiment.

FIG. 2A is a schematic diagram of an internal structure of a controlled device according to an embodiment. As shown in FIG. 2A, the controlled device includes a processor (e.g., processing circuitry) connected to a system bus, a non-volatile storage medium, memory (e.g., random access memory circuitry), an image acquisition device (e.g., imaging circuitry), a network interface (e.g., interface circuitry), and an input device. The non-volatile storage medium of the controlled device stores an operating system and a computer readable instruction. The computer readable instruction is executed to implement an image obtaining method. The processor is configured to provide a calculating and control capability to support running of the entire server. The memory in the controlled device provides an environment for running of the computer readable instruction in the non-volatile storage medium. The network interface is used for network communication with a server, for example, uploading an image to the server and receiving an instruction sent by the server. The input device may be a touch layer covering a display screen, or may be a button, a trackball, or a touch panel disposed on a housing of the controlled device, or may be an external keyboard, a touch panel, or a mouse. Persons skilled in the art may understand that, the structure shown in FIG. 2A is merely a structure part related to the solutions of this application, and does not constitute a limitation to the terminal to which the solutions of this application are applied, and a specific controlled device may include more or fewer components than those shown in the figure, or some components may be combined, or a different component deployment may be used.

Figure 2B:
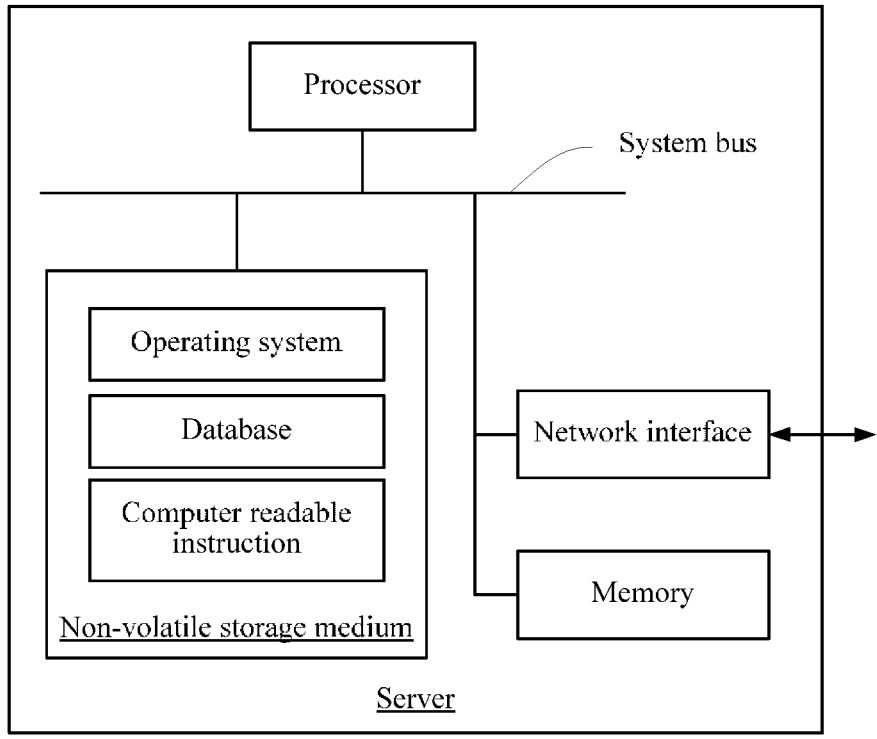
FIG. 2B is a schematic diagram of an internal structure of a server according to an embodiment.

FIG. 2B is a schematic diagram of the internal structure of a server according to an embodiment. As shown in FIG. 2B, the server includes a processor (e.g., processing circuitry) connected with a system bus, a non-volatile storage medium, memory, and an internet interface (e.g., interface circuitry). The non-volatile storage medium of the server stores an operating system, a database, and a computer readable instruction. The database stores map data and image data. The computer readable instruction is executed to implement an image obtaining method applied to the server. The processor of the server is configured to provide a calculating and control capability to support running of the entire server. The memory of the server provides an environment for running of an image obtaining system in the non-volatile storage medium. The network interface of the server is used for connection communication with a controlled device by using a network, for example, receiving an image sent by the controlled device and sending an instruction to the controlled device. The server may be an independent server, or may be implemented by a server cluster including multiple servers, or may be a cloud storage space. Persons skilled in the art may understand that, the structure shown in FIG. 2B is merely a structure part related to the solutions of this application, and does not constitute a limitation to the server to which the solutions of this application are applied, and a specific server may include more or fewer components than those shown in the figure, or some components may be combined, or a different component deployment may be used.

Figure 3:
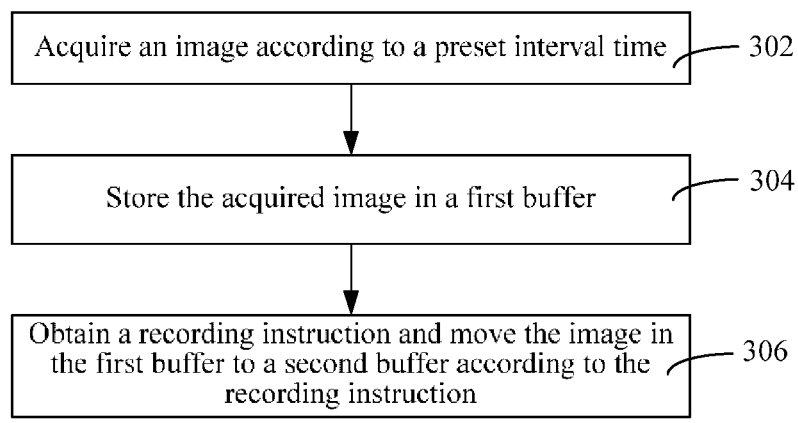
FIG. 3 is a flowchart of an image obtaining method according to an embodiment.

FIG. 3 is a flowchart of an image obtaining method according to an embodiment. As shown in FIG. 3, an image obtaining method, running on a controlled device, including the following steps:

Step 302: Acquire an image according to a preset interval time.

In this embodiment, the preset interval time may be set according to needs, for example, 1 second and 0.1 second, which is not limited herein. The controlled device automatically grabs the image according the preset interval time.

Step 304: Store the acquired image in a first buffer.

In this embodiment, the capacity of a space of the first buffer may be configured according to conditions. For example, if the capacity of a buffer of the controlled device is 2 GB (gigabyte), the capacity of the first buffer may be 1 GB.

Step 306: Obtain a recording instruction and move the image in the first buffer to a second buffer according to the recording instruction.

In this embodiment, the recording instruction generated by operating a button on the controlled device by a user is obtained and the image in the first buffer is completely moved to the second buffer according to the recording instruction.

In the image obtaining method, the acquired image is stored in the first buffer. The image in the first buffer is moved to the second buffer after obtaining the recording instruction, so that image shooting can be implemented without professional recording devices. The method is applied to any controlled device with lens, thus reducing costs of image obtaining. In addition, the image in the first buffer is transferred to the second buffer to save after obtaining the recording instruction, thus saving a storage space.

In an embodiment, the image obtaining method further includes: uploading the image in the second buffer to a server after the obtain a recording instruction and move the image in the first buffer to a second buffer according to the recording instruction.

In this embodiment, the image moved to the second buffer is automatically uploaded to the server to store. After uploading, the image in the second buffer already uploaded to the server is cleared, so that the second buffer can further store the image moved by the first buffer. The image in the second buffer is uploaded to the server to save for a long period.

In an embodiment, after the step of moving the image in the first buffer to a second buffer according to the recording instruction, the image obtaining method further includes: clearing the image in the first buffer already moved to the second buffer. The image in the first buffer is cleared so as to further acquire an image.

In an embodiment, the image obtaining method further includes: determining whether the acquired image is larger than a remaining space of the first buffer. If the acquired image is larger than the remaining space of the first buffer, the image in the first buffer is deleted, and then determining whether the acquired image is larger than a remaining space of the first buffer. If the acquired image is smaller than a remaining space of the first buffer, the acquired image is stored in the first buffer.

In an embodiment, the image obtaining method further includes: binding the controlled device with a first user identity before the acquisition of the image according to a preset interval time and store the acquired image in a first buffer.

In this embodiment, binding the controlled device with the first user identity refers to building a correspondence between the controlled device and the first user identity. A first user identity firstly building a correspondence with the controlled device is an owner of the controlled device. After the first user identity shares the controlled device with another first user identity, if the another first user identity builds a correspondence with the controlled device, the another first user identity becomes a sharer of the controlled device. The first user identity may be an instant messaging account, a social application account, a phone number, or the like.

In an embodiment, the image obtaining method further includes: receiving a configuration instruction of the first user identity and configuring a space ratio between the first buffer and the second buffer of the controlled device according to the configuration instruction.

In this embodiment, the configuration instruction refers to a configuration instruction sent by the first user identity after logging in a terminal. The space ratio between the first buffer and the second buffer is set according to needs. For example, if the capacity of a buffer of the controlled device is 2 GB, the space ratio between the first buffer and the second buffer is 5:5 or 4:6, which is not limited herein.

In an embodiment, after the step of acquiring an image according to a preset interval time, the image obtaining method further includes: obtaining a time and/or a geographic location of the acquired image.

In this embodiment, the time that the image is acquired is obtained when acquiring the image, for example, an image acquired at 10:10:10, Feb. 24, 2016. A mapping relationship is built between the image and the acquired time. A time of the controlled device may be used as the time of the image or a network time when the image is uploaded may be used as the time of the image.

The geographic location where the image is acquired is obtained when acquiring the image, for example, if an image is acquired at Beijing Tiananmen Square, the geographic location is recorded as Beijing Tiananmen Square. A globe positioning system (GPS) or the Beidou satellite may be used to position the geographic location of the controlled device.

Further, the time and the geographic location that the image is acquired may be simultaneously obtained when acquiring the image.

In an embodiment, the step of uploading the image in the second buffer to a server further includes: uploading the image in the second buffer and/or the time and the geographic location of the image to the server.

In this embodiment, the image in the second buffer is uploaded to the server. At the same time, the time and/or the geographic location that the image is acquired is uploaded.

In an embodiment, an image obtaining method including the following steps: receiving an uploaded image in a second buffer after a controlled device obtains a recording instruction and moves an image in a first buffer to the second buffer according to the recording instruction; the controlled device acquiring the image according to a preset interval time and storing the image in the first buffer.

In this embodiment, the server receives the image in the second buffer uploaded by the controlled device. The image in the second buffer is moved from the first buffer to the second buffer according to a recording instruction after the controlled device obtains the recording instruction.

In the image obtaining method, the acquired image is stored in the first buffer. The image in the first buffer is moved to the second buffer after obtaining the recording instruction and the image in the second buffer is uploaded to the server, so that image shooting can be implemented without professional recording devices. The method is applied to any controlled device with lens, thus reducing costs of image obtaining.

In an embodiment, the image obtaining method further includes: obtaining a closing instruction of a continuous capture function of the controlled device and closing the continuous capture function of the controlled device according the closing instruction. Closing and opening of the continuous capture function of the controlled device may be effectively controlled. The continuous capture function refers to acquiring the image according to the preset interval time.

Figure 4:
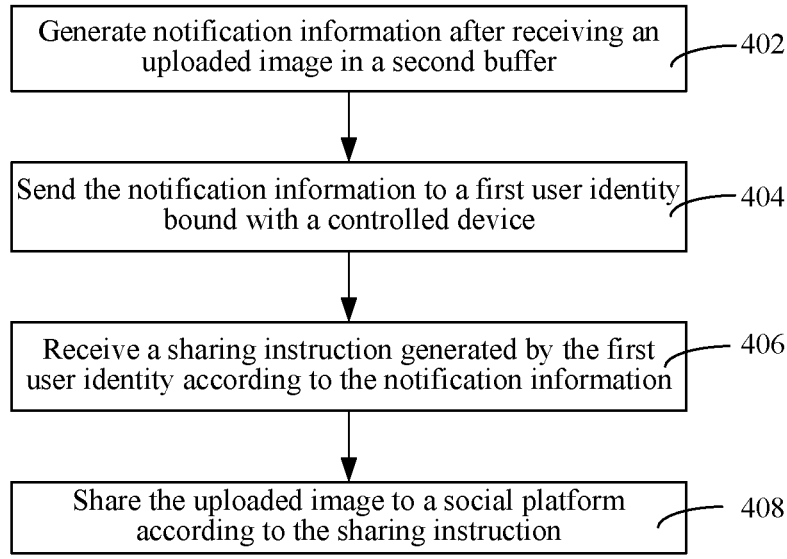
FIG. 4 is a flowchart of an image obtaining method according to an embodiment.

FIG. 4 is a flowchart of an image obtaining method according to an embodiment. As shown in FIG. 4, an image obtaining method, running on a server, including steps 402 to 408:

Step 402: Generate notification information after receiving an uploaded image in a second buffer.

In this embodiment, the notification information may be instant messaging information, social application information, massage information, or the like.

Step 404: Send the notification information to a first user identity bound with a controlled device.

In this embodiment, the first user identity may be an instant messaging account, a social application account, a phone number, or the like.

Step 406: Receive a sharing instruction generated by the first user identity according to the notification information.

In this embodiment, an operation of sharing the image to a social platform by the first user identity according to the notification information is obtained and the sharing instruction is generated according to the operation.

In other embodiments, a viewing request sent by the first user identity may further be received and the image is returned to the first user identity according to the viewing request.

Step 408: Share the uploaded image to a social platform according to the sharing instruction.

In this embodiment, the social platform may be Wechat, Weibo, Facebook, or the like.

The image obtaining method generates the notification information after receiving the uploaded image in the second buffer, sends the notification information to the first user identity, so as to timely remind the first user identity that the controlled device uploads a new image, and shares the image to the social platform after obtaining the sharing instruction of the first user identity to implement image sharing, thus benefiting image sharing and spreading.

Further, in an embodiment, the image obtaining method further includes: obtaining comment information of the image from a friend of the first user identity and displaying the comment information.

Figure 5:
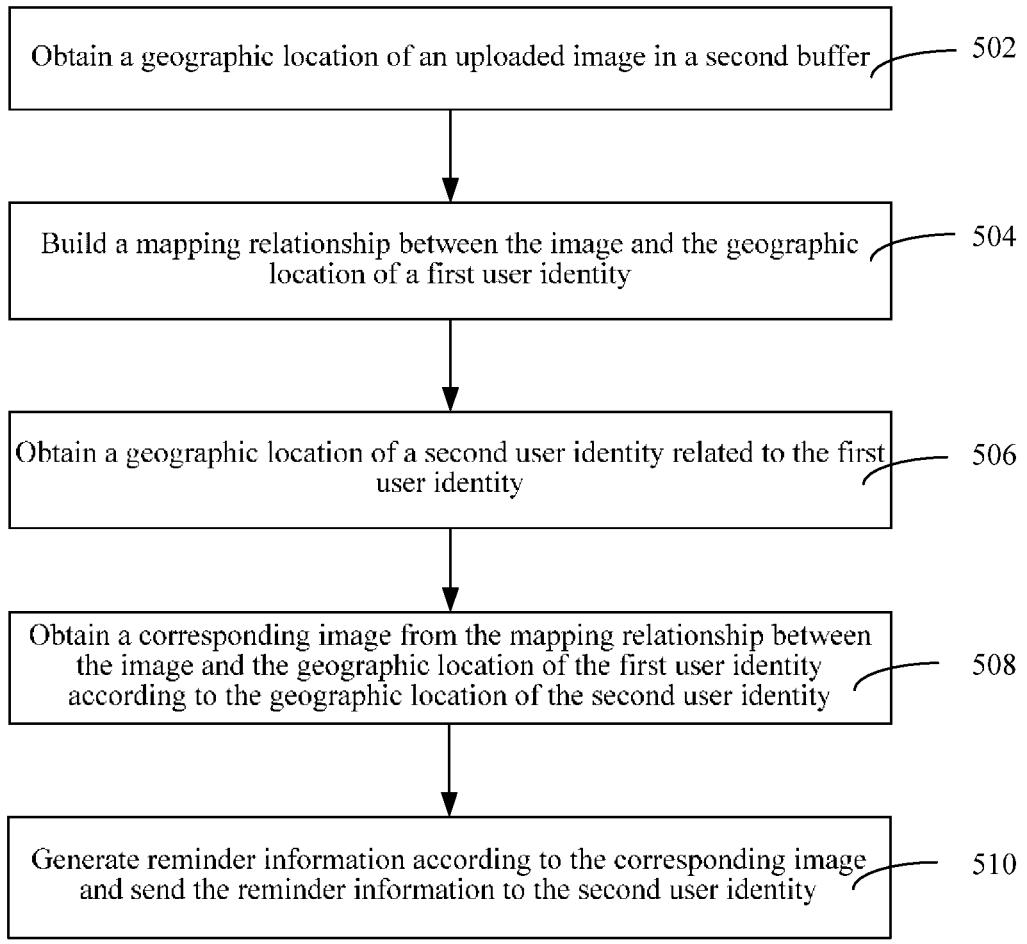
FIG. 5 is a flowchart of an image obtaining method according to another embodiment.
Figure 6:
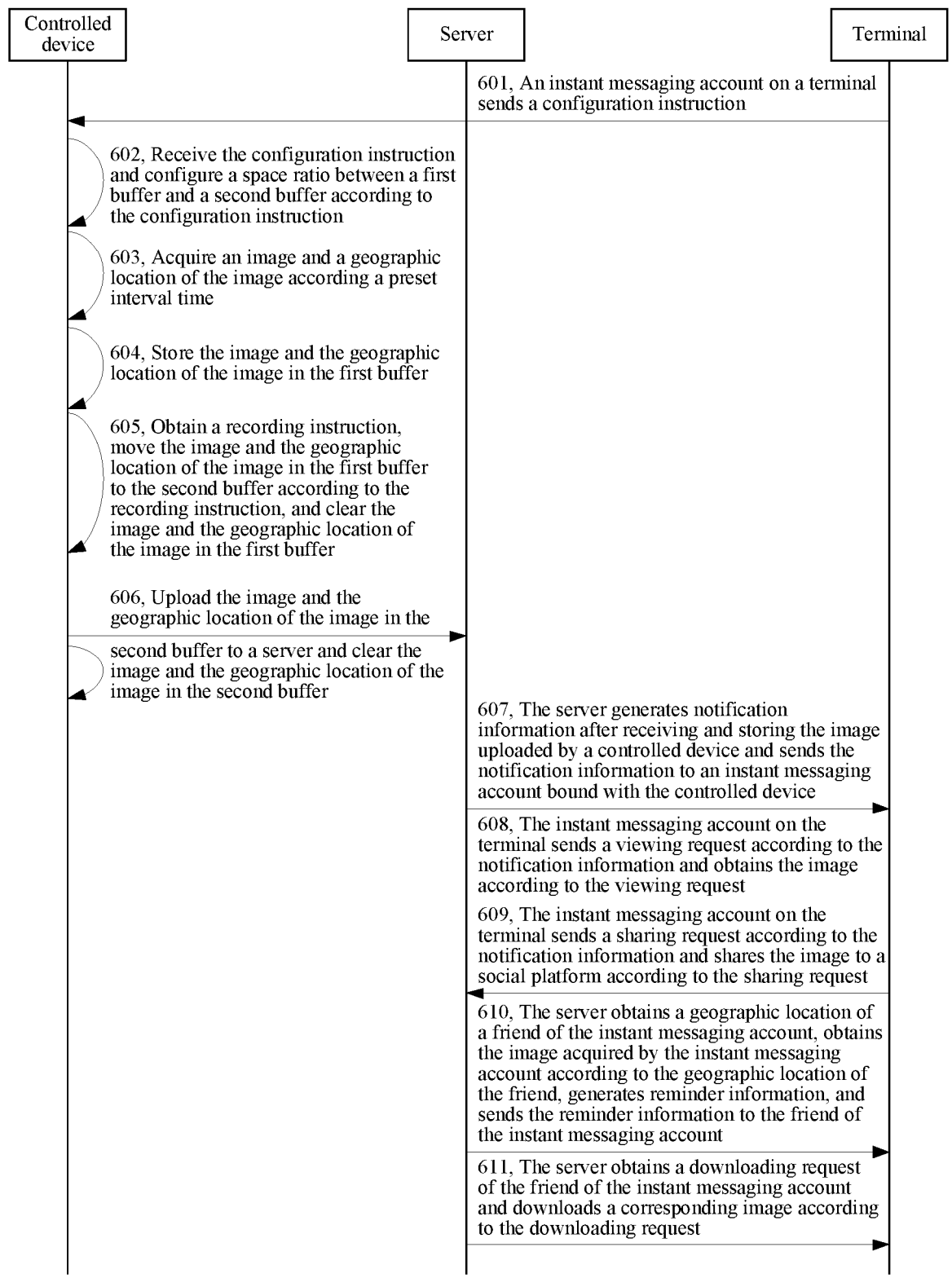
FIG. 6 is a schematic diagram of a specific application process of an image obtaining method according to an embodiment.

FIG. 5 is a flowchart of an image obtaining method according to another embodiment. As shown in FIG. 5, an image obtaining method, running on a server, including step 502 to step 508:

Step 502: Obtain a geographic location of an uploaded image in a second buffer.

In this embodiment, the server obtains the geographic location of the uploaded image in the second buffer.

Step 504: Build a mapping relationship between the image and the geographic location of a first user identity.

In this embodiment, the mapping relationship is built between the image and the geographic location of the first user identity. For example, an image of raising a flag is shot at Beijing Tiananmen Square and a mapping relationship is built between the image of raising the flag and the geographic location of Beijing Tiananmen Square.

Step 506: Obtain a geographic location of a second user identity related to the first user identity.

In this embodiment, the second user identity related to the first user identity refers to a user identity having a friend relationship, a stranger relationship, or a secondary friend relationship with the first user identity. The first user identity and the second user identity are both a unique string identifying a user identity. The string may include one or more than one of numbers, letters, and characters.

Step 508: Obtain a corresponding image from the mapping relationship between the image and the geographic location of the first user identity according to the geographic location of the second user identity.

In this embodiment, the corresponding image is found from the mapping relationship between the image and the geographic location according to geography after obtaining the geographic location of the second user identity.

Step 510: Generate reminder information according to the corresponding image and send the reminder information to the second user identity.

In this embodiment, a request of downloading the image by the second user identity according to the reminder information is obtained after the reminder information is sent to the second user identity. The image is sent to the second user identity, so that the second user identity can timely obtain the image acquired by the first user identity at the geographic location of the second user identity.

The image obtaining method obtains the geographic location of the second user identity related to the first user identity after building the mapping relationship between the image and the geographic location of the first user identity and sends the reminder information to the second user identity after finding the image of the first user identity according to the geographic location of the second user identity, so that the second user identity conveniently shares the image acquired by the first user identity, thus benefiting image sharing.

Further, in an embodiment, the image obtaining method further includes: obtaining a time segment selected by the second user identity, selecting a corresponding image according to the time segment, and sending the selected image to the second user identity. The time segment refers to a time interval disposed by the second user identity according to needs. The server selects an image in the time segment from the image obtained at the geographic location of the second user identity according to the time segment.

To describe a process of the image obtaining method more clearly, the following describes with reference to a specific application situation. Use that a controlled device is bound with an instant messaging account as an example, the process of the image obtaining method includes:

Step 601: An instant messaging account on a terminal sends a configuration instruction to the controlled device.

Step 602: The controlled device receives the configuration instruction and configures a space ratio between a first buffer and a second buffer according to the configuration instruction.

Figure 7:
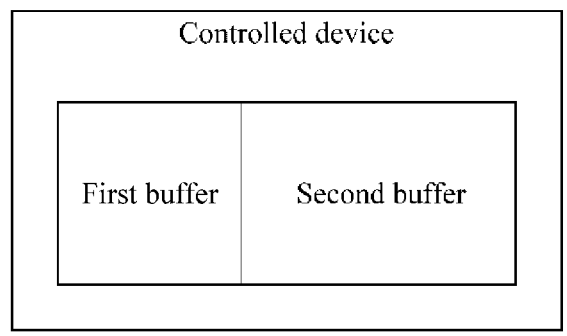
FIG. 7 is a space ratio of a buffer configured by a controlled device according to a configuration instruction.

FIG. 7 is a space ratio of a buffer configured by a controlled device according to a configuration instruction. As shown in FIG. 7, the controlled device receives the configuration instruction sent by an instant messaging account bound with the controlled device. The buffer of the controlled device is configured as the first buffer and the second buffer of a ratio value according to the ratio value in the configuration instruction. For example, if the capacity of the buffer of the controlled device is 3 GB and the space ratio of the first buffer and the second buffer is 1:2, the capacity of the first buffer is 1 GB and the capacity of the second buffer is 2 GB.

Step 603: The controlled device acquires an image and a geographic location of the image according a preset interval time.

Step 604: The controlled device stores the image and the geographic location of the image in the first buffer.

Step 605: The controlled device obtains a recording instruction, moves the image and the geographic location of the image in the first buffer to the second buffer according to the recording instruction, and clears the image and the geographic location of the image in the first buffer.

In this embodiment, when a user of the controlled device considers that the stored image needs to be recorded, the user directly triggers the controlled device by a button. The controlled device obtains the recording instruction generated by a one-button operation of the user of the controlled device and moves the image and the geographic location of the image in the first buffer to the second buffer according to the recording instruction.

Step 606: The controlled device uploads the image and the geographic location of the image in the second buffer to a server and clears the image and the geographic location of the image in the second buffer.

Step 607: The server generates notification information after receiving and storing the image uploaded by a controlled device and sends the notification information to an instant messaging account bound with the controlled device.

Step 608: The instant messaging account on the terminal sends a viewing request according to the notification information and obtains the image according to the viewing request.

Figure 8:
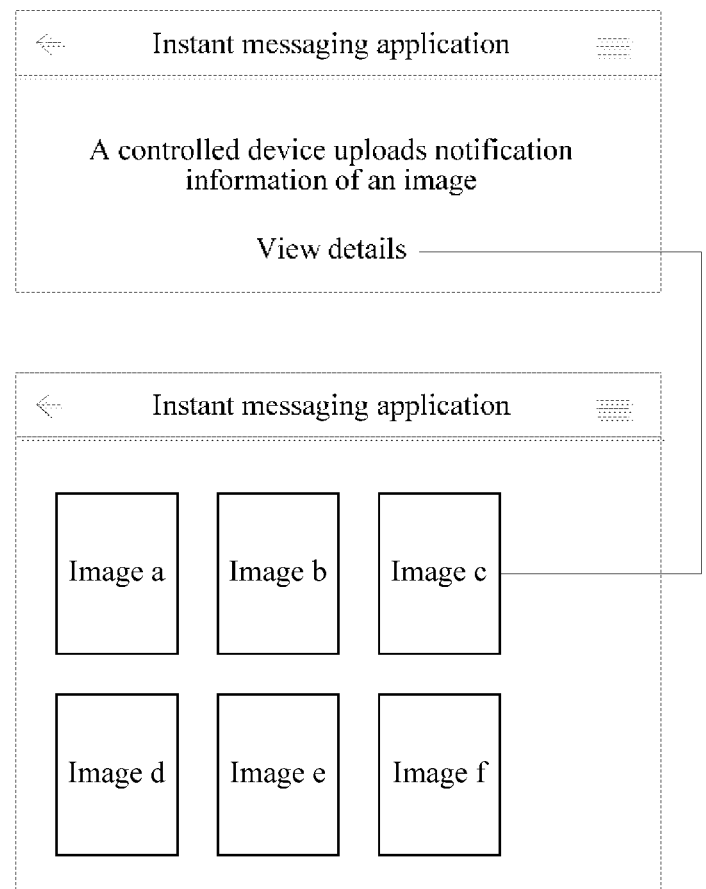
FIG. 8 is a schematic diagram of viewing an image by an instant messaging account.

FIG. 8 is a schematic diagram of viewing an image by an instant messaging account. As shown in FIG. 8, the instant messaging account sends a viewing request after receiving notification information of the image uploaded by a controlled device and sent be a server, obtains the image according to the viewing request, and displays the image at a window.

Step 609: The instant messaging account on the terminal sends a sharing request according to the notification information and shares the image to a social platform according to the sharing request.

Figure 9:
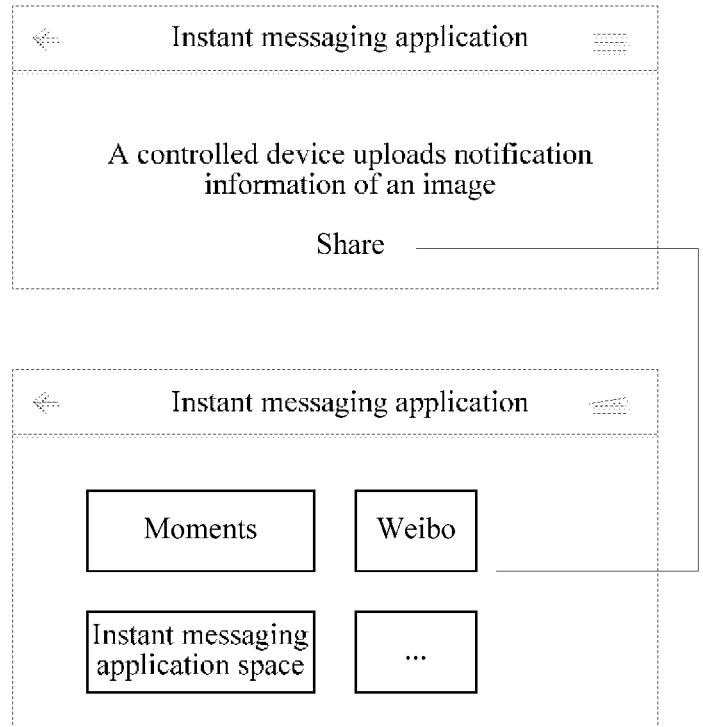
FIG. 9 is a schematic diagram of sharing an image to a social platform by an instant messaging account.

FIG. 9 is a schematic diagram of sharing an image to a social platform by an instant messaging account. As shown in FIG. 9, the instant messaging account sends a sharing request to share the image to Weibo, moments, or an instant messaging application space.

Step 610: The server obtains a geographic location of a friend of the instant messaging account, obtains the image acquired by the instant messaging account according to the geographic location of the friend, generates reminder information, and sends the reminder information to the friend of the instant messaging account.

Figure 10:
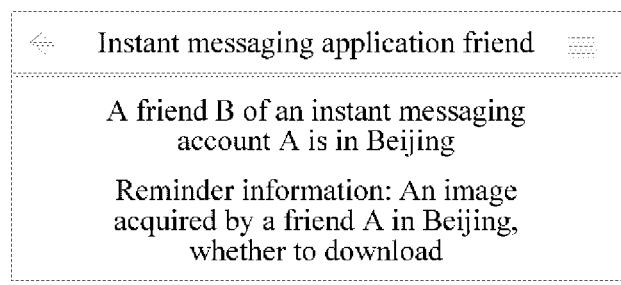
FIG. 10 is a schematic diagram of pushing reminder information to an instant messaging friend.

FIG. 10 is a schematic diagram of pushing reminder information to an instant messaging friend. As shown in FIG. 10, if an instant messaging account A acquires an image in Beijing and a friend B of the instant messaging account A is also in Beijing, the reminder information is generated and sent to the friend B. The reminder information includes information of whether to download the image acquired by A in Beijing.

Step 611: The server obtains a downloading request of the friend of the instant messaging account and downloads a corresponding image according to the downloading request.

Figure 11:
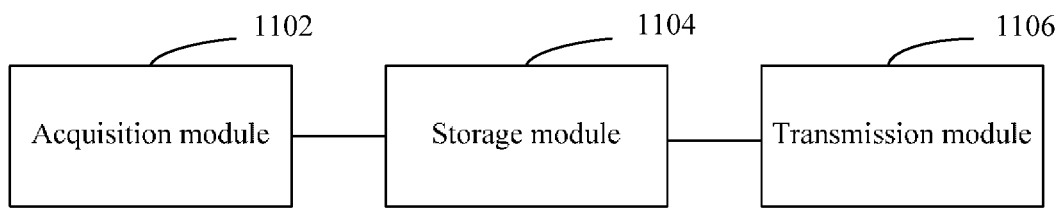
FIG. 11 is a structural block diagram of an image obtaining system according to an embodiment.

FIG. 11 is a structural block diagram of an image obtaining system according to an embodiment. As shown in FIG. 11, an image obtaining system includes an acquisition module 1102, a storage module 1104, and a transmission module 1106.

The acquisition module 1102 is configured to acquire an image according to a preset interval time.

The storage module 1104 is configured to store the acquired image in a first buffer.

The transmission module 1106 is configured to obtain a recording instruction and move the image in the first buffer to a second buffer according to the recording instruction.

In the image obtaining system, the acquired image is stored in the first buffer. The image in the first buffer is moved to the second buffer after obtaining the recording instruction, so that image shooting can be implemented without professional recording devices. The system is applied to any controlled device with lens, thus reducing costs of image obtaining. In addition, the image in the first buffer is transferred to the second buffer to save after obtaining the recording instruction, thus saving a storage space.

In an embodiment, the acquisition module 1102 is further configured to obtain a time and/or a geographic location of the acquired image after the acquisition of the image according to a preset interval time.

An uploading module 1108 is further configured to upload the image in the second buffer and the time and/or the geographical location of the image to a server.

Figure 12:
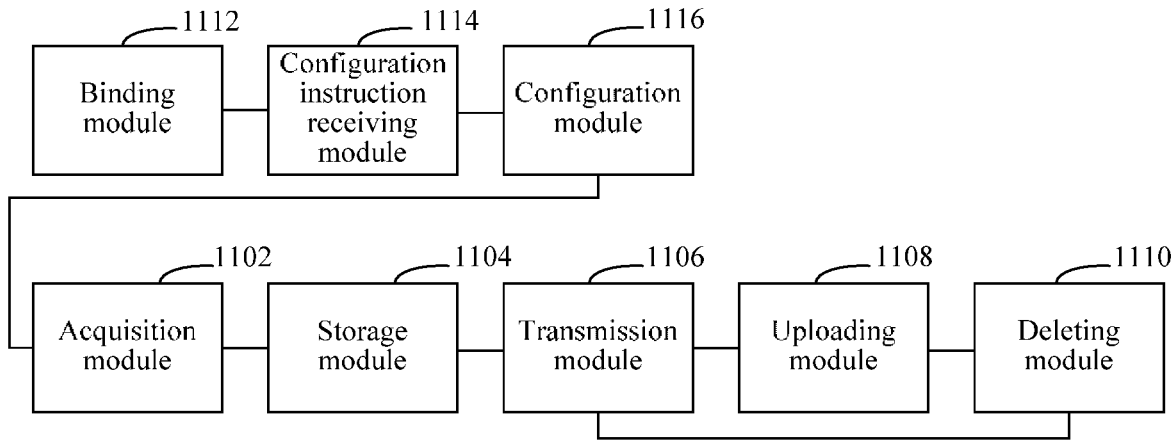
FIG. 12 is a structural block diagram of an image obtaining system according to another embodiment.

FIG. 12 is a structural block diagram of an image obtaining system according to another embodiment. As shown in FIG. 12, an image obtaining system includes an acquisition module 1102, a storage module 1104, and a transmission module 1106, and further includes an uploading module 1108, a deleting module 1110, a binding module 1112, a configuration instruction receiving module 1114, and a configuration module 1116.

The uploading module 1108 is configured to upload an image in a second buffer to a server.

The deleting module 1110 is configured to clear the image in the first buffer already moved to the second buffer after the move the image in the first buffer to a second buffer according to the recording instruction and clear the image in the second buffer already uploaded to the server after the upload an image in a second buffer to a server.

The binding module 1112 is configured to bind the controlled device with a first user identity before the acquire an image according to a preset interval time and store the acquired image in a first buffer.

The configuration instruction receiving module 1114 is configured to receive a configuration instruction of the first user identity after binding the controlled device with the first user identity.

The configuration module 1116 is configured to configure a space ratio between the first buffer and the second buffer of the controlled device according to the configuration instruction.

In an embodiment, the image obtaining system further includes a determining module. The determining module is configured to determine whether the acquired image is larger than a remaining space of the first buffer. If the acquired image is larger than the remaining space of the first buffer, the deleting module 1110 deletes the image in the first buffer, and then the determining module determines whether the acquired image is larger than a remaining space of the first buffer. If the acquired image is smaller than a remaining space of the first buffer, the storage module 1104 stores the acquired image in the first buffer.

Figure 13:
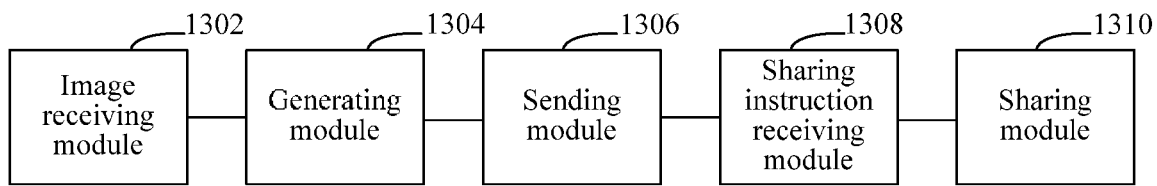
FIG. 13 is a structural block diagram of an image obtaining system according to another embodiment.

FIG. 13 is a structural block diagram of an image obtaining system according to another embodiment. As shown in FIG. 13, an image obtaining system includes an image receiving module 1302, a generating module 1304, a sending module 1306, a sharing instruction receiving module 1308, and a sharing module 1310.

The image receiving module 1302 is configured to receive an uploaded image in a second buffer after a controlled device obtains a recording instruction and moves an image in a first buffer to the second buffer according to the recording instruction.

The controlled device acquires the image according to a preset interval time and stores the image in the first buffer.

The generating module 1304 is configured to generate notification information after receiving the uploaded image in the second buffer.

The sending module 1306 is configured to send the notification information to a first user identity bound with the controlled device.

The sharing instruction receiving module 1308 is configured to receive a sharing instruction generated by the first user identity according to the notification information.

The sharing module 1310 is configured to share the uploaded image to a social platform according to the sharing instruction.

The image obtaining system generates the notification information after receiving the uploaded image in the second buffer, sends the notification information to the first user identity, so as to timely remind the first user identity that the controlled device uploads a new image, and shares the image to the social platform after obtaining the sharing instruction of the first user identity to implement image sharing, thus benefiting image sharing and spreading.

Figure 14:
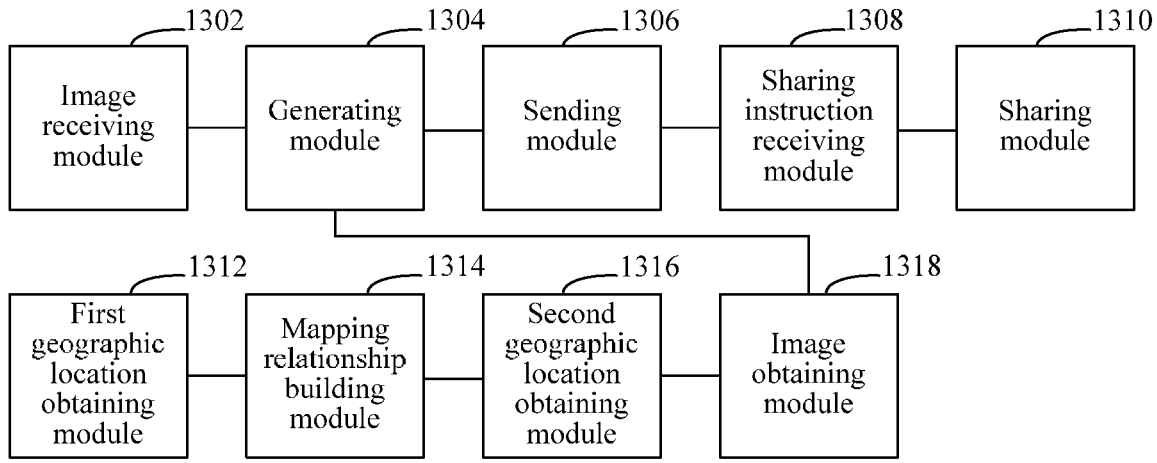
FIG. 14 is a structural block diagram of an image obtaining system according to another embodiment.

FIG. 14 is a structural block diagram of an image obtaining system according to another embodiment. As shown in FIG. 14, an image obtaining system includes an image receiving module 1302, a generating module 1304, a sending module 1306, a sharing instruction receiving module 1308, a sharing module 1310, a first geographic location obtaining module 1312, a mapping relationship building module 1314, a second geographic location obtaining module 1316, and an image obtaining module 1318.

The first geographic location obtaining module 1312 is configured to obtain a geographic location of an image uploaded in a second buffer.

The mapping relationship building module 1314 is configured to build a mapping relationship between the image and the geographic location of a first user identity.

The second geographic location obtaining module 1316 is configured to obtain a geographic location of a second user identity related to the first user identity.

The image obtaining module 1318 is configured to obtain a corresponding image from the mapping relationship between the image and the geographic location of the first user identity according to the geographic location of the second user identity.

The generating module 1304 is further configured to generate reminder information according to the corresponding image.

The sending module 1306 is further configured to send the reminder information to the second user identity.

The image obtaining system obtains the geographic location of the second user identity related to the first user identity after building the mapping relationship between the image and the geographic location of the first user identity and sends the reminder information to the second user identity after finding the image of the first user identity according to the geographic location of the second user identity, so that the second user identity conveniently shares the image acquired by the first user identity, thus benefiting image sharing.

In the image obtaining system, the image obtaining module 1318 is configured to obtain a time segment selected by the second user identity and select a corresponding image according to the time segment. The sending module 1306 is further configured to send the selected image to the second user identity. The time segment refers to a time interval disposed by the second user identity according to needs. The server selects an image in the time segment from the image obtained at the geographic location of the second user identity according to the time segment.

It is noted that the various modules, units, and components in the present disclosure can be implemented using any suitable technology. For example, a module or a unit can be implemented using processing circuitry. In an example, a module or a unit can be implemented using integrated circuit (IC). In another example, a module or a unit can be implemented as a processor executing software instructions. In another example, interface circuitry is used to implement receiving unit (or module) and/or sending unit (or module).

A person of ordinary skill in the art may understand that all or some of the processes of the methods in the foregoing embodiments may be implemented by a computer program instructing relevant hardware. The program may be stored in a non-volatile computer readable storage medium. When the program runs, the processes of the foregoing methods in the embodiments are performed. The storage medium may be a magnetic disc, an optical disc, a read-only memory (ROM), or the like.

The foregoing embodiments only show several implementations of the present disclosure and are described in detail, but they should not be construed as a limit to the patent scope of the present disclosure. It is noted that, a person of ordinary skill in the art may make various changes and improvements without departing from the ideas of the present disclosure, which shall fall within the protection scope of the present disclosure. Therefore, the protection scope of the patent of the present disclosure shall be subject to the claims.

What is claimed is:

1. A method for processing images, comprising:
   acquiring, by image generation circuitry of an imaging device, an image according to a preset time interval for acquiring images;
   storing the acquired image in first buffering circuitry of the imaging device;
   receiving a recording instruction;
   copying the acquired image from the first buffering circuitry to second buffering circuitry of the imaging device according to the recording instructions;
   uploading the acquired image that is stored in the second buffering circuitry of the imaging device to a server device via a network; and
   sending a sharing instruction to the server device that causes the server device to share the uploaded image to a social platform.

2. The method according to claim 1, wherein after the copying the acquired image from the first buffering circuitry to the second buffering circuitry of the imaging device according to the recording instruction, the method further comprises:
   clearing the first buffering circuitry of the imaging device to remove the acquired image that has been copied to the second buffering circuitry.

3. The method according to claim 1, wherein after the uploading the acquired image that is stored in the second buffering circuitry of the imaging device to the server device via the network, the method further comprises:
   clearing the second buffering circuitry of the imaging device to remove the acquired image from the second buffering circuitry.

4. The method according to claim 1, wherein before the acquiring the image according to the preset time interval for acquiring the images, the method further comprises:
   associating the imaging device with a first user identity;
   receiving a configuration instruction that is provided via the first user identity; and
   configuring a space ratio between the first buffering circuitry and the second buffering circuitry of the imaging device according to the configuration instruction.

5. The method according to claim 4, wherein the associating the imaging device with the first user identity further comprises:
   associating the imaging device with at least one of an instant messaging account, a social application account, and a phone number.

6. The method according to claim 1, wherein after the acquiring the image according to the preset time interval for acquiring the images, the method further comprises:
   obtaining a time and/or a geographical location of the acquired image; and
   uploading the acquired image that is stored in the second buffering circuitry and the time and/or the geographical location of the acquired image to a server device via a network.

7. The method according to claim 1, wherein copying the acquired image from the first buffering circuitry to the second buffering circuitry of the imaging device according to the recording instruction further comprises:
   copying multiple acquired images from the first buffering circuitry to the second buffering circuitry of the imaging device according to the recording instruction.

8. An apparatus, comprising:
   imaging circuitry configured to acquire images according to a preset time interval;
   memory circuitry configured to form a first buffer and a second buffer;
   interface circuitry configured to connect the apparatus to a network; and
   processing circuitry configured to:
      store an acquired image in the first buffer,
      receive a recording instruction via the interface circuitry,
      copy the acquired image from the first buffer to the second buffer according to the recording instruction,
      upload the acquired image that is stored in the second buffer of the apparatus to a server device via a network, and
      send a sharing instruction to the server device that causes the server device to share the uploaded image to a social platform.

9. The apparatus according to claim 8 wherein the processing circuitry is configured to:
   clear the first buffer to remove the acquired image from the first buffer after the acquired image has been copied to the second buffer.

10. The apparatus according to claim 8 wherein the processing circuitry is configured to:
    clear the second buffer to remove the acquired image from the second buffer after the acquired image has been uploaded.

11. The apparatus according to claim 8, wherein the processing circuitry is configured to:
    associate the apparatus with a first user identity;
    receive a configuration instruction that is provided via the first user identity; and
    configure the memory circuitry to have a space ratio between the first buffer and the second buffer formed in the memory circuitry according to the configuration instruction.

12. The apparatus according to claim 11, wherein the processing circuitry is configured to:
    associate the apparatus with at least one of an instant messaging account, a social application account, and a phone number.

13. The apparatus according to claim 8, wherein the processing circuitry is configured to:
    obtain a time and/or a geographical location of the acquired image; and
    upload the acquired image from the second buffer and the time and/or the geographical location of the acquired image to a server device via the interface circuitry.

14. The apparatus according to claim 8, wherein the processing circuitry is configured to:
    copy multiple acquired images from the first buffer to the second buffer according to the recording instruction.

15. A server device, comprising:
    interface circuitry configured to receive an image that is uploaded from an imaging device, the imaging device including a first buffer and a second buffer, the imaging device storing an acquired image in the first buffer, copying the acquired image from the first buffer to the second buffer in response to a recording instruction, and uploading the acquired image from the second buffer; and
    processing circuitry configured to:
       notify a first user identity that is associated with the imaging device;
       receive a sharing instruction from the first user identity; and
       share the uploaded image to a social platform according to the sharing instruction.

16. The server device according to claim 15, wherein the processing circuitry is configured to:
  associate uploaded images from the imaging device with geographic locations where the uploaded images are taken;
  obtain a geographic location of a second user identity;
  determine a corresponding image to the obtained geographic location of the second user identity according to the association of the uploaded images with the geographic locations;
  generate a reminder according to the corresponding image; and
  send the reminder to the second user identity.

17. The server device according to claim 16, wherein the processing circuitry is configured to:
  receive a time segment that is selected by the second user identity;
  select a corresponding image according to the time segment; and
  send the selected image to the second user identity.

* * * * *